US008678445B2

(12) United States Patent
Riekers et al.

(10) Patent No.: US 8,678,445 B2
(45) Date of Patent: Mar. 25, 2014

(54) COMPONENT CONNECTION

(75) Inventors: Ralf Riekers, Stuttgart (DE); Michael Weiβ, Plüderhausen (DE); Joachim Müller, Metzingen (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 148 days.

(21) Appl. No.: 12/366,156

(22) Filed: Feb. 5, 2009

(65) Prior Publication Data
US 2009/0200795 A1 Aug. 13, 2009

(30) Foreign Application Priority Data

Feb. 8, 2008 (DE) .......................... 10 2008 008 352

(51) Int. Cl.
*F16L 13/02* (2006.01)
(52) U.S. Cl.
USPC ...................................... 285/288.1; 285/223
(58) Field of Classification Search
USPC ............. 285/225, 288.1, 288.2, 288.9, 288.3, 285/288.4, 288.11, 289.5, 223, 288.5, 285/288.6, 229, 50, 148.13, 148.5, 224, 285/299, 49, 48, 148.22, 148.23; 403/50, 403/51; 464/79, 99
See application file for complete search history.

(56) References Cited

U.S. PATENT DOCUMENTS

| 1,665,916 | A | * | 4/1928 | Eschholz | 52/547 |
| 1,900,561 | A | * | 3/1933 | Junggren | 285/224 |
| 2,047,633 | A | * | 7/1936 | Jacobus | 285/141.1 |
| 2,183,757 | A | * | 12/1939 | Van Der Graaf | 122/511 |
| 2,209,325 | A | * | 7/1940 | Dennis | 285/300 |
| 2,273,154 | A | * | 2/1942 | Stromsoe | 285/55 |
| 2,331,932 | A | * | 10/1943 | Rowand | 122/365 |
| 2,349,792 | A | * | 5/1944 | Rosenblad | 285/15 |
| 2,352,038 | A | * | 6/1944 | Tolke | 285/229 |
| 2,470,167 | A | * | 5/1949 | Hobbs | 285/229 |
| 2,611,238 | A | | 9/1952 | Fryer, Jr. | |
| 2,702,987 | A | * | 3/1955 | Nicolin | 60/799 |
| 2,739,828 | A | * | 3/1956 | Schindler et al. | 285/148.12 |
| 2,752,172 | A | * | 6/1956 | Ziebold | 138/121 |
| 2,792,241 | A | * | 5/1957 | Bondley et al. | 285/288.6 |
| 2,878,040 | A | * | 3/1959 | Hobbs | 285/288.1 |

(Continued)

FOREIGN PATENT DOCUMENTS

CH 353947 A 4/1961
DE 924411 C 3/1955

(Continued)

*Primary Examiner* — Aaron Dunwoody
(74) *Attorney, Agent, or Firm* — Reinhart Boerner Van Deuren P.C.

(57) ABSTRACT

A connection between two annular sections of two components of an exhaust system of an internal combustion engine that is installed in a motor vehicle. In an embodiment, the two components are coaxial to one another. The connection comprises an annular connecting element with a first ring section, and a second ring section concentric to the first ring section. The ring sections are axially connected to one another in a rigid fashion on the face side by means of a connecting region. The first ring section is rigidly connected to the annular section of the first component by means of a first connecting region spaced apart from the connecting region. The second ring section is rigidly connected to the annular section of the second component by means of a second connecting region spaced apart from the connecting region. The connection is characterized by a high fatigue strength under thermal stress.

13 Claims, 1 Drawing Sheet

(56) References Cited

U.S. PATENT DOCUMENTS

| | | | |
|---|---|---|---|
| 2,910,314 A * | 10/1959 | Klein | 403/174 |
| 3,061,039 A * | 10/1962 | Peters | 181/233 |
| 3,072,422 A * | 1/1963 | Armstrong | 285/229 |
| 3,275,345 A * | 9/1966 | Waldron et al. | 285/47 |
| 3,856,335 A | 12/1974 | Blake | |
| 3,940,266 A * | 2/1976 | Goller et al. | 420/42 |
| 3,984,207 A * | 10/1976 | Abthoff et al. | 422/179 |
| 3,989,474 A * | 11/1976 | Goller et al. | 428/683 |
| 4,045,057 A * | 8/1977 | Halter | 285/49 |
| 4,089,535 A * | 5/1978 | Sattinger | 277/644 |
| 4,198,078 A * | 4/1980 | Herbert | 285/49 |
| 4,265,983 A * | 5/1981 | Leitnaker | 428/683 |
| 4,294,614 A * | 10/1981 | Kotecki | 420/46 |
| 4,315,644 A * | 2/1982 | Jansing | 285/179 |
| 4,525,620 A * | 6/1985 | Deverell et al. | 219/137 WM |
| 4,540,203 A * | 9/1985 | Lambert | 285/226 |
| 4,802,882 A * | 2/1989 | Heidrich | 464/99 |
| 4,844,274 A * | 7/1989 | Sterk | 220/581 |
| 5,102,150 A * | 4/1992 | Kahn | 277/646 |
| 5,171,042 A * | 12/1992 | Faidiga | 285/55 |
| 5,364,309 A * | 11/1994 | Heidrich et al. | 464/99 |
| 5,667,224 A * | 9/1997 | Streckert et al. | 277/634 |
| 6,065,756 A * | 5/2000 | Eignor et al. | 285/223 |
| 7,445,248 B2 * | 11/2008 | Thaler et al. | 285/47 |
| 2006/0267340 A1* | 11/2006 | Galatello Adamo et al. | 285/288.1 |
| 2007/0216159 A1* | 9/2007 | Yoshihara et al. | 285/288.1 |

FOREIGN PATENT DOCUMENTS

| | | |
|---|---|---|
| DE | 1027019 B | 3/1958 |
| DE | 11 30 654 B | 5/1962 |
| DE | 1208422 B | 1/1966 |
| DE | 69709308 T2 | 8/2008 |
| GB | 946256 A | 1/1964 |
| WO | WO 79/00656 | 9/1979 |

* cited by examiner

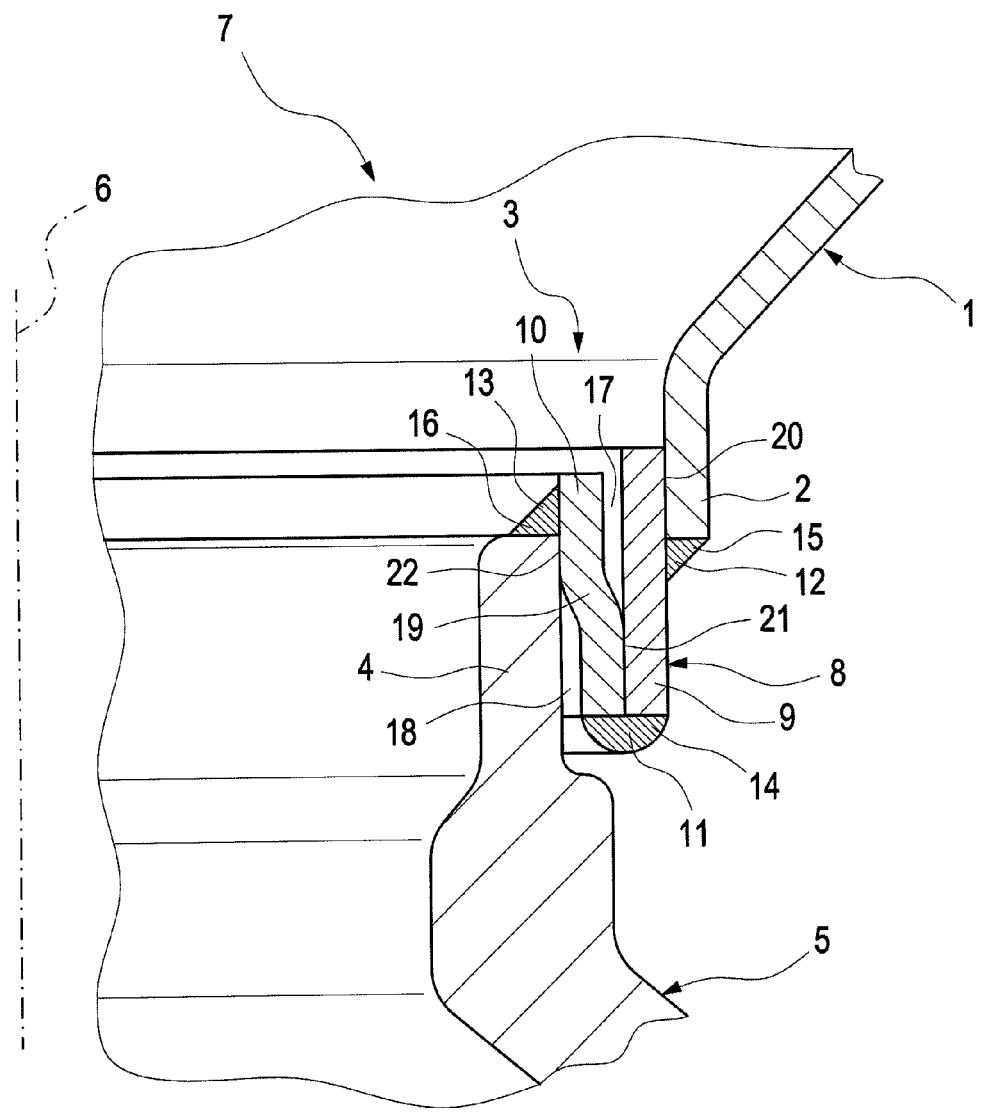

COMPONENT CONNECTION

CROSS-REFERENCE TO RELATED PATENT APPLICATIONS

This patent application claims the benefit of co-pending German Patent Application No. DE 102008008352.6, filed Feb. 8, 2008, the entire teachings and disclosure of which are incorporated herein by reference thereto.

FIELD OF THE INVENTION

The present invention pertains to exhaust systems for internal combustion engines generally, and more particularly to a system and method for connecting components in exhaust systems for internal combustion engines.

BACKGROUND OF THE INVENTION

In devices that are subjected to high thermal stresses, problems may arise if two components with different coefficients of thermal expansion are rigidly connected to one another within the device. Extremely high stresses can occur in the region of this connection and lead to fatigue and ultimately the failure of the connection. These problems also occur, in particular, in exhaust systems of internal combustion engines, primarily if an austenitic component is connected to a ferritic component. The choice of ferrite material on one hand and austenite material on the other hand results from different requirements with respect to the thermal stability and the sturdiness of the respective component. In the present context, the connection between an exhaust manifold and an exhaust turbo charger is of particular interest. The exhaust manifold preferably consists of a ferrite material while an austenite material is chosen for the housing of the turbo charger.

It would therefore be desirable to have a system and method for providing a connection of the type initially cited, and for providing an exhaust system featuring such a connection, wherein said connection and exhaust system are respectively characterized in that they have a comparatively high fatigue strength.

Embodiments of the invention provide such a system and method and address the aforementioned problems via the objects of the independent claims. Advantageous embodiments form the objects of the dependent claims.

BRIEF SUMMARY OF THE INVENTION

Embodiments of the invention are based on the fundamental idea of realizing the connection between the two coaxially arranged annular sections of the two components with the aid of an annular connecting element that features at least two concentric ring sections. If two ring sections are provided, they are axially connected to one another in a rigid fashion on the face side by means of a connecting region and respectively connected to one of the annular sections of the components in a rigid fashion at a location that is axially spaced apart therefrom. This connecting technique allows the respective annular connecting sections of both components to carry out radial movements relative to one another within the connection, wherein the two ring sections and/or the connecting region yield elastically and act like a radial spring. The connecting element simultaneously produces a comparatively stiff or rigid connection between the connecting sections of the components in the axial direction such that the required axial forces can be transmitted. Due to the elasticity in the radial direction, thermally related tensions in the connecting element can be elastically absorbed. Consequently, the fatigue strength of the connection is relatively high.

According to one particularly advantageous embodiment, the connecting element features at least one section or region with a coefficient of thermal expansion that lies between the coefficients of thermal expansion of a ferrite material and an austenite material. This design is particularly advantageous if one of the two components is ferritic at least in the region of its annular connecting section while the other component is austenitic at least in the region of its annular connecting section. In such a configuration, the connecting element and therefore the entire connection is subjected to lower thermal stresses such that the fatigue strength of the connection is advantageously improved.

The connecting element may consist, in principle, of a preformed sheet metal element that is manufactured in one piece. Such a preformed sheet metal element can be manufactured in a comparatively inexpensive fashion. This preformed sheet metal element may be manufactured, in particular, of a duplex material. The term duplex material refers to a material, preferably steel, that has a two-phase structure, namely a ferrite phase and an austenite phase. Such a two-phase material consists, in particular, of a ferrite matrix with austenite islands embedded therein.

Alternatively, the connecting element may consist of an assembled component, in which the two annular sections form separate components that are rigidly connected to one another by means of the connecting region. A thusly assembled connecting element can be particularly well adapted to the respective operating conditions by selecting the materials for the individual components accordingly, wherein particularly high values for the fatigue strength of the connection can be achieved in this fashion.

Other important characteristics and advantages of the invention are disclosed in the dependent claims, the drawing and the corresponding description of the drawing.

It goes without saying that the above-described characteristics, as well as the characteristics yet to be described below, not only can be used in the respectively discussed combination, but also in other combinations or individually without deviating from the scope of the present invention.

BRIEF DESCRIPTION OF THE DRAWINGS

Preferred embodiments of the invention are illustrated in the drawing and described in greater detail below.

FIG. 1 schematically shows a highly simplified basic cross-section through an exhaust system in the region of a connection.

DETAILED DESCRIPTION OF THE INVENTION

According to FIG. 1, a first component 1 that is only partially illustrated can be fixed on a second component 5 that also is only partially illustrated, namely by means of a connection 3 between a first annular section 2 that is also referred to as the first connecting section 2 below and a second annular section 4 that is referred to as the second connecting section 4 below. The annular connecting sections 2, 4 extend annularly or in the circumferential direction referred to a longitudinal axis 6, wherein the longitudinal axis 6 simultaneously defines an axial direction that extends parallel to the longitudinal axis 6. In this case, the term "annular shape" includes at least circular, elliptical and oval cross sections. However, the two components 1 and 5 preferably form, without restricting the generality, components of an otherwise not-shown exhaust system 7 of an internal combustion engine that may be installed, in particular, in a vehicle. The first component 1 may consist, in particular, of an exhaust manifold while the second component 5 may consist, for example, of a housing of an exhaust turbo charger. The exhaust manifold 1 and the exhaust turbo charger 5 are interconnected by means of a connection 3. If the exhaust manifold 1 is realized in the form of an exhaust manifold with an inner shell and an outer shell that are isolated by an air gap, the exhaust turbo charger 5 or its housing, respectively, may be connected to only the inner shell or only the outer shell or to the inner shell and the outer shell by means of the connection 3.

The connection 3 comprises an annular connecting element 8, by means of which the two components 1, 5 are connected to one another. To this end, the connecting element 8 features a first ring section 9 and a second ring section 10. It would also be possible, in principle, to provide more than two ring sections. The ring sections 9, 10 are realized in a sleeve-shaped or cylindrical fashion, particularly a circular-cylindrical fashion, and extend coaxial to the longitudinal axis 6 and concentric to one another or within one another, respectively. In this case, the first ring section 9 is preferably arranged radially outward while the second ring section 10 is arranged radially inward relative thereto. The two ring sections 9, 10 are axially connected to one another in a rigid fashion on the face side by means of a connecting region 11. To this end, the connecting region 11 is respectively connected in a rigid fashion to one axial end of the respective ring sections 9, 10 on the face side. In addition, the first ring section 9 is rigidly connected to the first connecting section 2 of the first component 1 by means of a first connecting region 12 that is axially spaced apart from the connecting region 11. The second ring section 10, in contrast, is rigidly connected to the second connecting section 4 of the second component 5 by means of a second connecting region 13 that is axially spaced apart from the connecting region 11. Since the connecting regions 12, 13 are axially spaced apart from the connecting region 11, the connecting element 8 can act like a radial spring. The two ring sections 9, 10 form spring legs that are fixed on one another by means of the connecting region 11. In this case, the spring effect is realized in the form of elastic bending deformations in the region of the ring sections 9, 10 and/or in the connecting region 11.

If more than two ring sections 9, 10 are provided, there exist at least one central ring section, as well as the first ring section 9 and the second ring section 10 that function as outer ring sections 9, 10. One end of this central ring section or each central ring section is then axially connected to one of the two outer ring sections 9 or 10 in a rigid fashion by means of such a connecting region 11 while its other end is axially connected to the other outer ring section 9, 10 or, if applicable, to another central ring section in a rigid fashion by means of such a connecting region 11.

The connecting element 8 preferably consists entirely or at least partially of a material with a coefficient of thermal expansion that lies between the coefficient of thermal expansion of a ferrite material and the coefficient of thermal expansion of an austenite material. The coefficient of thermal expansion of the connecting element 8 preferably lies in a central range of an interval that is defined by the coefficients of thermal expansion of ferrite and austenite. The utilization of such a connecting element 8 is particularly advantageous if one component 1 or 2 is ferritic while the other component 1 or 2 is austenitic. In the preferred example shown, the first component 1, particularly the exhaust manifold 1, is ferritic while the second component 5, particularly the turbo charger housing, is austenitic. It goes without saying that the first component 1 only needs to be ferritic, in principle, in the region of its first connecting section 2. Analogously, the second component 5 only needs to be austenitic, in principle, in the region of its second connecting section 4. In such a configuration, the fatigue strength of the connection 3 can be increased by utilizing the connecting element 8 that has a medium coefficient of thermal expansion.

In the preferred embodiment shown, the connecting element 8 is composed of several components that are manufactured separately such that the connecting element could also be referred to as an assembled connecting element 8 below. In an assembled connecting element 8, at least two ring sections 9, 10 are formed by separately manufactured ring elements that are rigidly connected to one another by means of such a connecting region 11. In this case, the connecting region 11 may consist of a welding seam 14. In this case, the welding seam 14 is preferably produced with an austenite material or with a duplex material. It is particularly advantageous that the connecting region 11 is situated radially outward, i.e., at a comparatively cold side of the connection. The thermal stress of this connecting region 11 therefore is reduced in comparison with an inner arrangement.

In the assembled connecting element 8, the ring section fixed on the first component 1, i.e., the first ring section 9, preferably consists of a duplex material. Alternatively, the first ring section 9 may also consist of a ferrite material or of a nickel-based alloy. The nickel-based alloy is characterized by a higher corrosion resistance, as well as by a particularly high thermal stability. The nickel-based alloy preferably has a relatively high nickel content. It has a lower coefficient of thermal expansion than austenite and a higher coefficient of thermal expansion than ferrite. It is preferred to use a nickel-based alloy that is known under the commercial name Inconel.

In the assembled connecting element 8, the ring section fixed on the second component 5, i.e., the second ring section 10, preferably consists of an austenite material. Alternatively, the second ring section 10 may also consist of a duplex material.

As an alternative to the assembled variation, it would also be conceivable, in principle, to realize an embodiment, in which the connecting element 8 is manufactured in one piece, wherein the connecting element 8 is preferably realized in the form of a preformed sheet metal element. This integral or one-piece connecting element 8 may be manufactured, for example, by forming a corresponding disc-shaped blank. This integral connecting element 8 may consist, for example, of a duplex material.

Regardless of whether the connecting element 8 is manufactured in one piece or assembled of several components, the connecting regions 12 and 13 may respectively consist of welding seams 15 and 16. In this case, the welding seam 15 of the first connecting region 12 is preferably produced with the aid of a duplex material. Alternatively, it would also be possible, in principle, to utilize a ferritic welding material. This first connecting region 12 is also situated radially outward and therefore subjected to reduced thermal stress. The welding seam 16 of the second connecting region 13 is preferably produced by means of an austenite material. It is situated radially inward and therefore needs to have a higher thermal stability. Alternatively, it would also be possible, in principle, to utilize a duplex material in this case.

In a first component 1 of ferrite material, the first ring section 9 preferably also consists of ferrite material or of a duplex material or of a nickel-based alloy while the second ring section 10 of a second component 5 of austenite material also consists of austenite material or of a duplex material. In this case, the welded connection 12 preferably consists of a duplex material while the welded connection 15 consists of ferrite material or a duplex material and the welded connection 16 consists of austenite material or a duplex material.

The design of the connecting element 8 illustrated in the figure, in which an annular gap 17 is formed radially between the two ring sections 9, 10, is particularly advantageous in this respect. This annular gap 17 thermally isolates the two ring sections 9, 10 by a certain gap that reduces the heat transfer between the two components 1, 5. Additionally or alternatively, an annular gap 18 may be formed radially between the second ring section 10 and the second connecting section 4. This annular gap 18 also realizes a thermal isolation that reduces the heat transfer between the two components 1, 5. Additionally or alternatively, an annular gap that, however, is not provided in the example shown could also be realized radially between the first ring section 9 and the first connecting section 2.

In order to realize the annular gaps 17, 18 illustrated in the figure, the second ring section 10 is designed in a stepped fashion such that it features at least two axial sections. The lower axial section illustrated on the bottom in FIG. 1 is connected to the upper axial section illustrated on the top in FIG. 1 by a staggered region 19. The inside diameter of the lower axial section is greater than the inside diameter of the upper axial section such that the annular gap 17 can be realized. Furthermore, the outside diameter of the lower axial section is greater than the outside diameter of the upper axial section such that the annular gap 18 is realized. Except for the staggered region 19, the second ring section 10 has a straight profile. Analogously, the first ring section 9 has an overall straight profile in this case. This results in flat contact zones, namely a first contact zone 20, in which the first ring section 9 flatly adjoins the first connecting section 2 radially, a second contact zone 21, in which the two ring sections 9, 10 flatly adjoin one another radially, as well as a third contact zone 22, in which the second ring section 10 flatly adjoins the second connecting section 4 radially.

In this case, the gap width of the respective gap 17, 18 measured in the radial direction is smaller than the wall thickness of the first ring section 9 or the second ring section 10 measured in the radial direction. Both ring sections 9, 10 preferably have approximately identical wall thicknesses. In the example shown, the two ring sections 9, 10 approximately have the same axial length. It is preferred that the respective annular gap 17, 18 axially extends over 50% of the respective ring section 9, 10. The respective contact zones 20, 21, 22 preferably extend over approximately 50% of the respective ring section 9, 10.

The described connection 3 significantly reduces the heat transfer between the two components 1, 5 because the heat conduction takes place via the connecting element 8 and is hindered, in particular, by the annular gaps 17, 18.

What is claimed is:

1. An apparatus comprising: a connection between two radially-separated annular sections of two components that are arranged coaxial to one another and joined only by an annular connecting element that is rigidly connected to each of the two radially-separated annular sections by means of a first connecting region and a second connecting region, respectively, the two components configured to be disposed in an exhaust system of an internal combustion engine that is installed in a motor vehicle, the annular connecting element having at least two concentric ring sections, wherein two of these ring sections are axially connected to one another in a rigid fashion on a face side by means of a third connecting region, and an annular gap is formed radially between the two ring sections, wherein a first ring section is rigidly connected to the annular section of the first component by means of the first connecting region that is spaced apart from the third connecting region while a second ring section is rigidly connected to the annular section of the second component by means of the second connecting region that is spaced apart from the third connecting region.

2. The apparatus of claim 1, wherein the entire connecting element or at least a section or region thereof has a coefficient of thermal expansion that lies between the coefficients of thermal expansion of a ferrite material and an austenite material.

3. The apparatus of claim 1 wherein the first connecting region is realized in the form of a welding seam that comprises a duplex material or a ferrite material.

4. The apparatus of claim 1, wherein the second connecting region is realized in the form of a welding seam that comprises an austenite material or a duplex material.

5. The apparatus of claim 1, wherein the connecting region is realized in the form of a welding seam that comprises an austenite material or a duplex material.

6. The apparatus of claim 1, wherein the first ring section comprises a duplex material or a ferrite material or a nickel-based alloy.

7. The apparatus of claim 1, wherein the second ring section comprises an austenite material or a duplex material.

8. The apparatus of claim 1, wherein the connecting element is realized in the form of a preformed sheet metal element that is manufactured in one piece and comprises a duplex material.

9. The apparatus of claim 1, wherein an annular gap is formed on at least one of the ring sections radially between the respective ring section and the annular section of the respective component fixed thereon.

10. The apparatus of claim 1, wherein at least one other ring section is arranged concentrically between the first ring section and the second ring section, wherein one end of this other ring section is axially connected to the first ring section in a rigid fashion by means of such a connecting region and its other end is axially connected to the second ring section or to another ring section in a rigid fashion by means of such a connecting region.

11. An exhaust system for an internal combustion engine of a motor vehicle comprising at least two components that are connected to one another by means of the apparatus of claim 1.

12. The apparatus of claim 1, wherein the connecting element allows radial movement of the two components.

13. An apparatus comprising: a connection between two radially-separated annular sections of two components that are arranged coaxial to one another and joined only by an annular connecting element that is rigidly connected to each of the two radially-separated annular sections by means of a first connecting region and a second connecting region, respectively, the two components configured to be disposed in an exhaust system of an internal combustion engine that is installed in a motor vehicle, the annular connecting element having at least two concentric ring sections, wherein two of these ring sections are axially connected to one another in a rigid fashion on a face side by means of a third connecting region, and wherein a first ring section is rigidly connected to the annular section of the first component by means of the first connecting region that is spaced apart from the third connecting region while a second ring section is rigidly connected to the annular section of the second component by means of the second connecting region that is spaced apart from the third connecting region, and an annular gap is formed radially between the two ring sections; wherein a first component of the two components comprises a ferritic material at least in the region of the first connecting region, wherein a second component of the two components comprises an austenitic material at least in the region of the second connecting region; and wherein the connecting element is entirely, or at least partially, a material with a coefficient of thermal expansion that lies between the coefficient of thermal expansion of the ferrite material and the coefficient of thermal expansion of the austenitic material.

* * * * *